TILT-PROOF CABINET CONSTRUCTION

Original Filed April 5, 1965

United States Patent Office

Re. 26,902
Reissued May 26, 1970

26,902

TILT-PROOF CABINET CONSTRUCTION

Nat Levenberg, 2 Windsor Place,
Lynbrook, N.Y. 11563

Original No. 3,361,509, dated Jan. 2, 1968, Ser. No. 569,998, Aug. 3, 1966, which is a continuation of application Ser. No. 445,583, Apr. 5, 1965. Application for reissue Sept. 2, 1969, Ser. No. 865,221
Int. Cl. A47b *88/00*
U.S. Cl. 312—273 11 Claims

Matter enclosed in heavy brackets [ ] appears in the original patent but forms no part of this reissue specification; matter printed in italics indicates the additions made by reissue.

ABSTRACT OF THE DISCLOSURE

A tilt-proof cabinet construction including a housing, and at least one pair of drawers, cord means interconnecting said drawers, and of predetermined length for preventing more than one of said pair of drawers from being withdrawn from said housing to maximum extension at any one instant.

This application is a continuation of my application Ser. No. 445,583, filed Apr. 5, 1965, now abandoned; under the same title.

This invention relates generally to the field of drawer-type cabinets and more particularly to an improved construction incorporating means for preventing the tipping of the cabinet owing to the fact that more than one drawer is withdrawn from the main housing thereof to a degree wherein the center of gravity of the cabinet plus contents lies outside of the interior of the cabinet housing.

This problem occurs most frequently in the case of file cabinets, which are filled almost to capacity with paper files and where it is desired to obtain the contents from more than one drawer. Where a lower drawer is opened and the contents of an upper drawer are also desired by those who fail to return the lower drawer to its initial condition, upon the outward movement of the upper drawer the center of gravity is shifted sufficiently toward the user as to tip the entire cabinet about a forward edge thereof with consequent danger of spilling the contents and possibly injuring the person standing in front of the lower drawers.

By assuring that at least one-half of the drawers are in closed position at any one time, where all of the drawers contain approximately the same load the shifting of the center of gravity outwardly of the cabinet can be effectively prevented. In the present invention, it is proposed to solve the problem by coupling pairs of drawers in such manner that only one drawer in each pair can be withdrawn to the full possible extension, and should a second drawer of a pair be also pulled open, force is transmitted to the first drawer to close the same simultaneously with the opening of the second drawer.

It is therefore among the principal objects of the present invention to provide an improved cabinet construction which is so constructed that the center of gravity always remains within the confines of the cabinet portion thereof.

Another object of the invention lies in the provision of an improved construction for achieving the above end which may be incorporated into existing constructions at minimal cost.

Yet another object of the invention lies in an improved cabinet construction incorporating means for accomplishing the above object in which the additional cost thereof is minimal, thereby permitting consequent wide sale, distribution and use.

Yet another object of the invention lies in the provision of improved means for assuring that the center of gravity of a drawer-type cabinet will not be shifted outwardly therefrom which means is fully concealed from view at all times thereby not materially affecting the external appearance of the cabinet.

A feature of the invention lies in the fact that the incorporation of the above described means in no way affects the otherwise normal operation of the cabinet.

These objects and features, as well as other incidental ends and advantages, will more fully appear in the progress of the following disclosure and be pointed out in the appended claims.

In the drawing, to which reference will be made in the specification, similar reference characters have been employed to designate corresponding parts throughout the several views.

Figure 1:
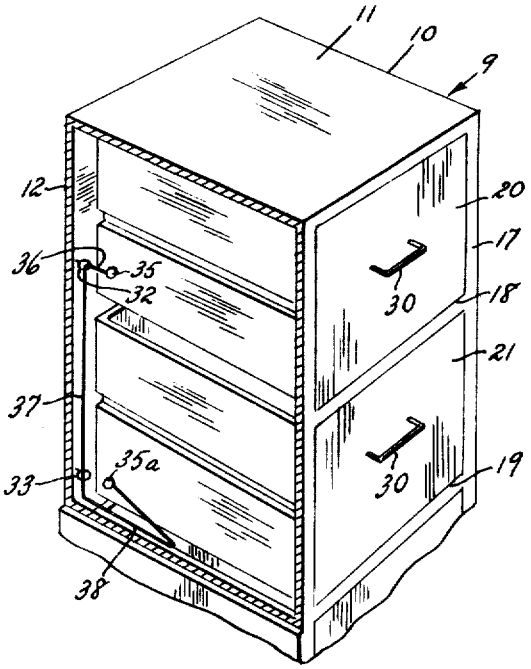
FIGURE 1 is a fragmentary view in perspective, partially broken away to show detail, of an embodiment of the invention.

In accordance with the invention, an embodiment thereof, generally indicated by reference character 9, includes a housing 10. The housing may be formed of wood, metal or other suitable material, and includes an upper wall 11, a rear wall 12, a pair of side walls 13, and a lower wall 15 which may be positioned either directly upon a supporting horizontal surface (not shown) or be provided with a base structure 16 in turn resting upon a floor. A front wall 17 is provided with openings 18 and 19 to slidably receive a corresponding plurality of drawers 20 and 21 which are mounted on suitable suspension members 22 and 23 (see FIGURE 5).

The drawers 20–21 are substantially similar, and, as is well-known in the art, each includes a bottom wall 24 and side walls 25 and 26 having elongated grooves 27 therein for engaging the suspension members 22–23. The walls 24–26 are interconnected inwardly thereof by a rear wall 28, and forwardly thereof by a front wall 29 having a suitable handle 30 and optional locking means (not shown).

Figure 2:
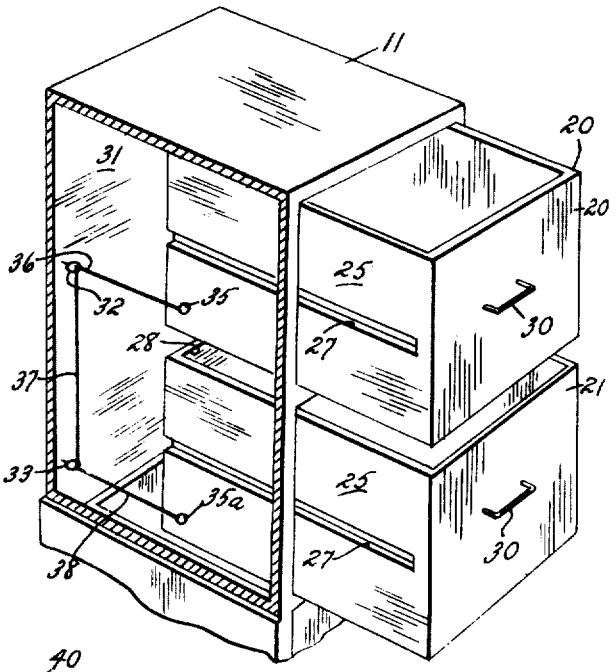
FIGURE 2 is a similar view in perspective, showing the drawer portions thereof in partially extended condition.
Figure 3:
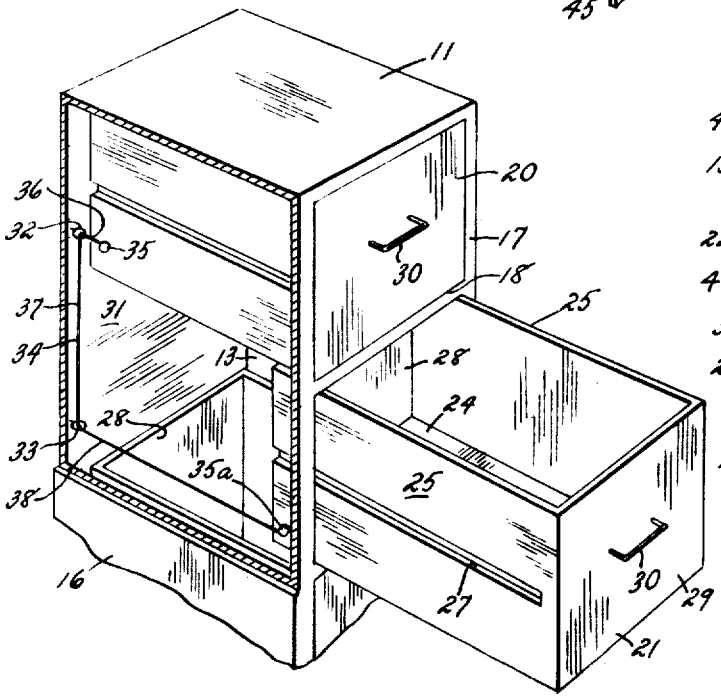
FIGURE 3 is a similar view in perspective, showing one drawer in fully extended condition and the other in fully closed condition.

Disposed upon an inner surface 31 of the rear wall 12 are first and second eyelet members 32 and 33, respectively. Where the construction is of wood or similar material, the members 32 and 33 are preferably in the form of conventional screw eyes of well-known type. Passing through the eyelets 32 and 33 is an elongated cable or cord 34 having first and second terminals 35 and 35a, respectively, secured to a portion of the side wall 25 of each of the drawers 20 and 21. As best seen in FIGURES 1, 2 and 3, depending upon the position of the drawers, the cable or cord 34 forms a continuously variable upper horizontal segment 36, a vertical segment 37 of constant length, and a variable horizontal segment 38.

Referring to FIGURE 1, where both drawers 20 and 21 are in a closed position, either drawer may be pulled outwardly without interference. Should the lower drawer 21 be pulled part way out, the upper drawer 20 may also be pulled part way out without interference, in which case the center of gravity of the cabinet drawers and contents remains just inside the housing 10. Should the lower drawer 21 be pulled outwardly to fullest possible extension, the cord or cable 34 becomes tensed and motion is transmitted through the same to result in rearward or inward movements of the upper drawer. It will be observed that no more than two drawers need to be coupled to each other, since in the case where the cabinet has four or six drawers it is still only necessary to keep three drawers within the cabinet at all times in order to maintain the center of gravity also within the cabinet.

Figure 4:
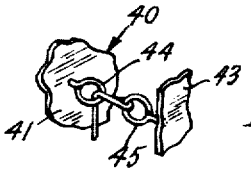
FIGURE 4 is a fragmentary view in perspective showing an alternate form of the embodiment.
Figure 5:
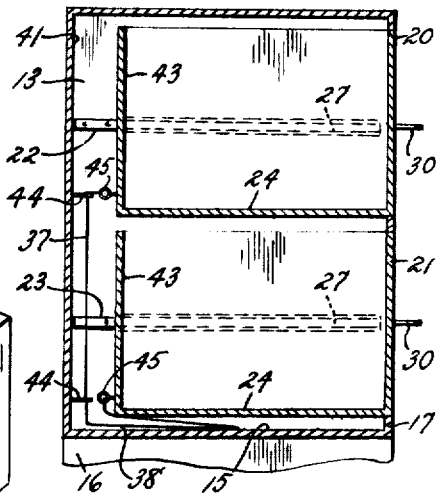
FIGURE 5 is a longitudinal central sectional view, partly in elevation, of the alternate form.

Turning now to the alternate construction illustrated in FIGURES 4 and 5, this construction differs from the principal form in that the cord is mounted so as to engage the rear wall of the drawers rather than a side wall thereof. This, the alternate form, generally indicated by reference character 40, includes a portion 41 of the inner surface of the rear wall of the housing where an eyelet 44 is mounted, and a corresponding rear wall of the drawer 43 which mounts an eyelet 45. This construction, while useful, has a disadvantage in that the full width of the cabinet cannot be as effectively utilized, as illustrated in FIGURE 5.

I wish it to be understood that I do not consider the invention limited to the precise details of structure shown and set forth in this specification, for obvious modifications will occur to those skilled in the art to which the invention pertains.

I claim:

1. Tilt-proof cabinet construction comprising: a housing, a pair of drawers slidably arranged for movement within said housing and outwardly thereof, and means engaging a portion of each drawer and a fixed surface of said housing for permitting only one of said plurality of drawers to be selectively withdrawn to maximum extension outwardly of said housing, said means including a flexible cord of predetermined length, eyelet means on an inner surface of said housing, said cord slidably passing through said eyelets, said cord having first and second ends, at least one of said ends being maintained in fixed relation relative to said housing during movement of either drawer to full extension.

2. Structure in accordance with claim 1, in which said first end of said cord being attached to one of said drawers, said second end being attached to another of said drawers.

*3. Tilt-proof cabinet construction comprising: a housing; a plurality of drawers mounted in said housing, each of said drawers being mounted in said housing for selective movement between a fully extended position and a fully retracted position; and a flexible connector interengaged between said housing and drawers and extendable to a taut condition by movement of any one of said drawers to its fully extended position and operable to hold the remainder of said plurality of drawers fully retracted when in said taut condition such that said one drawer must be retracted from its fully extended position before another of said drawers can be moved from its fully retracted position.*

*4. Tilt-proof cabinet construction comprising: a housing having a rear wall and a pair of side walls; a plurality of drawers mounted in said housing; each of said drawers having a bottom wall, a pair of side walls, and a rear wall; each of said drawers being mounted in said housing for selective movement between a fully extended position and a fully retracted position; and an elongated flexible connector interconnecting each of said drawers with said housing; each end of said connector being anchored to one of said housing and drawers and having a length such that it is pulled taut when one of said drawers is fully extended and is operable to hold the remainder of said plurality of drawers fully retracted when in said taut condition whereby another of said plurality of drawers can move from its fully retracted position only upon retraction of said one drawer from its fully extended position.*

*5. Tilt-proof cabinet construction as claimed in claim 4 wherein at least one end of said connector is anchored to one of said drawers.*

*6. Tilt-proof cabinet construction as claimed in claim 5 wherein the other end of said connector is anchored to another of said drawers.*

*7. Tilt-proof cabinet construction comprising: a housing having side and rear walls; a plurality of drawers mounted in said housing, each of said drawers having a bottom wall, a pair of side walls, and a rear wall; each of said drawers being mounted in said housing for selective movement between a fully extended position and a fully retracted position; an elongated, flexible connector interconnecting said drawers with said housing; and means slidably connecting said connector with a wall of said housing intermediate the ends of said connector; each end of said connector being anchored to one of said housing and drawers, said connector having a length such that it is pulled taut by movement of any one of said drawers to its fully extended position and is operable, when taut, to hold the remainder of said plurality of drawers fully retracted whereby another of said drawers can be moved from its fully retracted position only upon retraction of said one drawer from its fully extended position.*

*8. Tilt-proof cabinet construction as claimed in claim 7 wherein said means includes eyelets on a wall of said housing.*

*9. Tilt-proof cabinet construction as claimed in claim 8 wherein one end of said connector is anchored to a wall of one of said drawers.*

*10. Tilt-proof cabinet construction as claimed in claim 9 wherein the other end of said connector is anchored to a wall of another of said drawers.*

*11. Tilt-proof cabinet construction comprising: a housing; a plurality of drawers mounted in said housing, each of said drawers being mounted in said housing for selective movement between a fully extended position and a fully retracted position; and a flexible connector interengaged between said housing and at least an adjacent pair of drawers and extendable to a taut condition by movement of one of said adjacent pairs of drawers to its fully extended position and operable, when taut, to hold the other of said pair of drawers fully retracted such that one drawer must be retracted from its fully extended position before the other of said drawers can be moved from its fully retracted position.*

References Cited

The following references, cited by the Examiner, are of record in the patented file of this patent or the original patent.

UNITED STATES PATENTS

| | | | |
|---|---|---|---|
| 678,235 | 7/1901 | Ferracioli | 99—377 |
| 1,238,514 | 8/1917 | Hartbeck | 312—221 X |
| 1,868,495 | 7/1932 | Einermann | 312—273 |
| 2,240,067 | 4/1941 | Bolesky et al. | 312—221 |
| 2,719,770 | 10/1955 | Roberts | 312—333 X |
| 2,848,293 | 8/1958 | Jurgens et al. | 312—222 |
| 3,199,937 | 8/1965 | Mitchell | 312—221 |

FOREIGN PATENTS

| | | |
|---|---|---|
| 632,580 | 5/1963 | Belgium. |
| 22,876 | 1912 | Great Britain. |

JAMES T. McCALL, Primary Examiner

U.S. Cl. X.R.

312—221, 222, 319, 333